United States Patent
Brown et al.

(10) Patent No.: US 10,411,973 B2
(45) Date of Patent: Sep. 10, 2019

(54) AUTOMATIC MICROSERVICE PROBLEM DETECTION IN ENTERPRISE APPLICATIONS

(71) Applicant: Red Hat, Inc., Raleigh, NC (US)

(72) Inventors: Gary Peter Brown, Grasbrunn (DE); Juraci Paixao Kroehling, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 15/463,596

(22) Filed: Mar. 20, 2017

(65) Prior Publication Data

US 2018/0270122 A1 Sep. 20, 2018

(51) Int. Cl.
| G06F 15/173 | (2006.01) |
| G06F 15/16 | (2006.01) |
| H04L 12/24 | (2006.01) |
| H04L 29/08 | (2006.01) |
| H04L 29/14 | (2006.01) |

(52) U.S. Cl.
CPC ...... *H04L 41/5032* (2013.01); *H04L 41/5035* (2013.01); *H04L 41/5045* (2013.01); *H04L 67/30* (2013.01); *H04L 69/40* (2013.01)

(58) Field of Classification Search
CPC ............. H04L 41/5032; H04L 41/5035; H04L 41/5045; H04L 43/08
USPC ................. 709/202–203, 223–226
See application file for complete search history.

(56) References Cited

U.S. PATENT DOCUMENTS

| 8,010,942 | B1* | 8/2011 | Mirza ...................... G06F 8/34 715/762 |
| 8,225,310 | B1 | 7/2012 | Robertson et al. |
| 8,606,892 | B2 | 12/2013 | Mallur et al. |
| 9,201,557 | B2 | 12/2015 | Jaisinghani |
| 9,319,286 | B2* | 4/2016 | Panuganty ............. H04L 43/04 |
| 9,792,103 | B2* | 10/2017 | Govindaraju ............ G06F 8/61 |
| 10,028,116 | B2* | 7/2018 | Riva ................. H04M 1/72522 |
| 2013/0185246 | A1* | 7/2013 | Salloum ................. H04L 43/50 706/52 |
| 2015/0067642 | A1 | 3/2015 | Chen et al. |
| 2016/0269482 | A1* | 9/2016 | Jamjoom ............ H04L 67/1095 |
| 2016/0357660 | A1 | 12/2016 | Dean et al. |
| 2017/0139695 | A1* | 5/2017 | Govindaraju ............ G06F 8/60 |
| 2017/0359217 | A1* | 12/2017 | Ahuja ................. H04L 67/1031 |
| 2018/0103064 | A1* | 4/2018 | Ahuja ..................... H04L 63/20 |
| 2018/0197190 | A1* | 7/2018 | Debusmann ....... G06Q 30/0205 |
| 2018/0288094 | A1* | 10/2018 | Ahuja ................ H04L 41/0893 |

* cited by examiner

*Primary Examiner* — Bharat Barot
(74) *Attorney, Agent, or Firm* — K&L Gates LLP

(57) ABSTRACT

A server system includes a memory, a processor in communication with the memory, and a server managing a plurality of cooperating microservices. The server executes on the at least one processor to capture tracing information reported during invocation of a set of cooperating microservices. The tracing information includes a service name and version information associated with at least one microservice of the set of cooperating microservices. Additionally, the server builds an application deployment profile from the service name and version information, compares the application deployment profile to an existing profile, and classifies the application deployment profile as a previously existing profile, a subset profile, an extension profile, and/or an updated profile. The server tracks performance data associated with the application deployment profile.

20 Claims, 8 Drawing Sheets

AUTOMATIC MICROSERVICE PROBLEM DETECTION IN ENTERPRISE APPLICATIONS

BACKGROUND

Computer systems may run applications or services that are provided via a server or cloud. A client computer system may send a request to a server that retrieves application installation files in an underlying database. The applications or services can be developed and deployed as a single unit or as multiple units, such as a collection of microservices. Applications that are developed as single unit may be a monolithic application that includes a user interface and data access codes combined into a single program from a single platform. Monolithic applications are self-contained and independent from other computing applications. Microservices or microservice architecture is a software development method of developing software applications as a suite of independently deployable smaller cooperating services. The cooperating services run processes and communicate to serve a business goal to form an enterprise application.

SUMMARY

The present disclosure provides new and innovative systems and methods for automatic microservice problem detection in enterprise applications. In an example, a system includes a memory, a processor in communication with the memory, and a server managing a plurality of cooperating microservices. The server executes on the at least one processor to capture tracing information reported during invocation of a set of cooperating microservices. The tracing information includes a service name and version information associated with at least one microservice of the set of cooperating microservices. Additionally, the server builds an application deployment profile from the service name and version information, compares the application deployment profile to an existing profile, and classifies the application deployment profile as a previously existing profile, a subset profile, an extension profile, and/or an updated profile. The server tracks performance data associated with the application deployment profile.

In an example, a method includes capturing, by a server, tracing information reported during invocation of a set of cooperating microservices. The tracing information includes a service name and version information associated with at least one microservice of the set of cooperating microservices. Additionally, the server builds an application deployment profile from the service name and version information, and the server compares the application deployment profile to an existing profile. The server classifies the application deployment profile as a previously existing profile, a subset profile, an extension profile, and/or an updated profile. The server also tracks performance data associated with the application deployment profile.

In an example, non-transitory machine readable medium stores code, which when executed by a processor, causes a server to capture tracing information reported during invocation of a set of cooperating microservices. The tracing information includes a service name and version information associated with at least one microservice of the set of cooperating microservices. The server builds an application deployment profile from the service name and version information, and the server compares the application deployment profile to an existing profile. Additionally, the server classifies the application deployment profile as a previously existing profile, a subset profile, an extension profile, and/or an updated profile. The server also tracks performance data associated with the application deployment profile.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
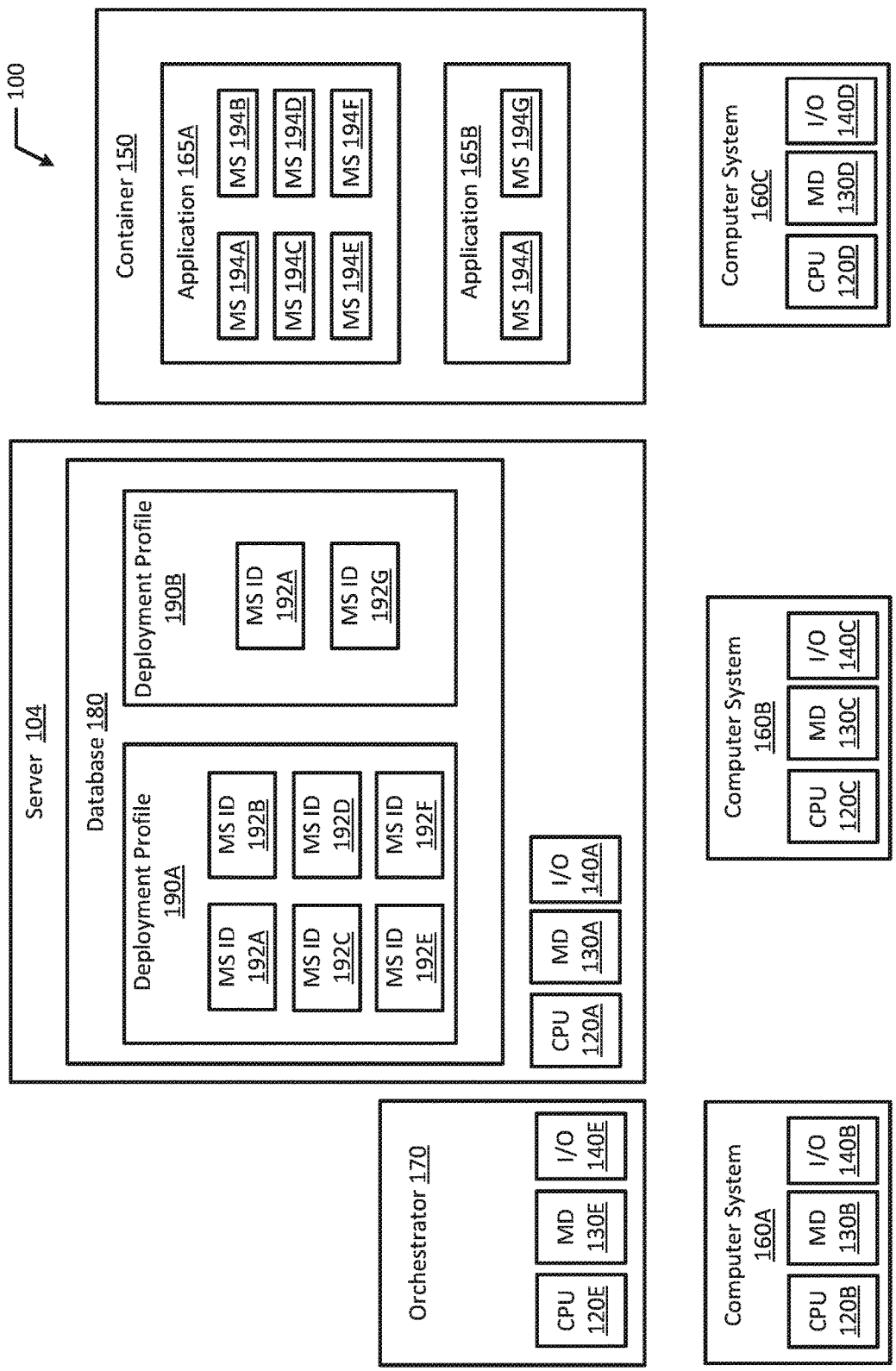
FIG. 1 illustrates a block diagram of an example server system according to an example embodiment of the present disclosure.

Techniques are disclosed for automatic microservice problem detection in enterprise applications. Existing techniques of updating an application involve building and deploying an entirely new version of the application (e.g., a unitary or monolithic application). Unfortunately, even a modification to a small section of the application may require building and deploying an entirely new version. Additionally, each time a small modification is made, the entire application is developed, rebuilt, tested, and deployed as a single unit, which is time consuming and may result in longer waiting periods between updates. Additionally, rebuilding an entire application from small changes may affect the modular structure of the application. Furthermore, when deploying monolithic applications to the cloud, scaling requires scaling of the entire application.

Conversely, a microservice architecture can be used, which advantageously enables separate teams to focus on a specific service and deploy the service as and when required. The microservice architecture advantageously allows faster turnaround for new feature requests and bug fixes. Additionally, when deploying microservices to the cloud, scaling may only require scaling specific microservices that require greater resources. However, each updated microservice may potentially introduce issues or bugs with different packages of cooperating microservices. To overcome such problems, application deployment profiles are built and categorized such that application performance can be tracked for the various microservice implementations. Additionally, new service versions may be introduced incrementally using scenarios such as Canary releases, A/B testing, Blue-Green deployment, or the like to enable an organization to test changes in a production environment, but at a limited scale, to minimize any potential negative impact that an updated microservice may have on an application. While an update to one microservice may improve the performance of that specific microservice, it may ultimately reduce the overall performance of the group of cooperating microservices or may reduce the performance of other microservices. For example, changes and updates to one microservice (e.g., A updated to A') may improve the performance of cooperating microservices (A', B, and C), but the same updated may reduce the overall performance of cooperating microservices (X, Y, and A'). At any time, several microservices may be updated at once, and considering the vast number of microservices and the numerous combinations of these microservices, it may be unclear which microservice is causing a bug or reducing performance. For example, given that multiple versions of microservices (e.g., A, A', A" and B, B') may be deployed at any given time in several different combinations (e.g., A'BC; XYA; A"BCD; AB'XY) of cooperating microservices, pinpointing the source of a performance reduction or bug is difficult to determine.

For example, a group of cooperating microservices may experience reduced performance after an update to several different microservices is implemented. This performance issue may be due to an update performing poorly or having a bug. Additionally, the performance issue may be due to the interaction between an updated microservice and another microservice that has not been updated yet. Furthermore, performance issues may only be present for certain clients or certain computer systems.

As discussed in the various example embodiments disclosed herein, to improve performance and detect bugs, a server may observe software components (e.g., microservices) and monitor the microservices using trace data to understand how the overall application using the distributed microservices is performing. The server may compare various versions of microservices and groups of services to determine when to fully implement an update or to roll back an update. Additionally, based on performance data obtained during monitoring, the server may advantageously decide which version of a microservice is best suited for each application. Multiple versions of a particular microservice may be deployed at any one time in a cloud environment based on varying levels of performance from a microservice in different enterprise applications. For example, the server builds and classifies application deployment profiles and tracks performance data. In instances with conflicting versions, the server will timestamp an application deployment profile to indicate an invocation of an updated microservice, which allows the server to track performance data associated with the update. Classifying each application deployment profile and tracking performance data, the server advantageously tracks the effect of updates of one or more microservices on the various combinations of cooperating microservices. Additionally, by classifying and tracking performance, the server can then determine whether an update should be expanded and implemented to a larger client base or whether the update should be rolled back. The server may determine that certain updates work well with specific cooperating services, while older versions work better with a different set of cooperating services and may implement the version of microservice that best fits the client's needs. By tracking performance of each classified application deployment profile, the server advantageously allows deployed microservices to be updated efficiently while minimizing risks associated with bugs or performance issues.

FIG. 1 depicts a high-level component diagram of an example server system 100 in accordance with one or more aspects of the present disclosure. The server system 100 may include a server 104 with a database 180. Additionally, the server system 100 may include an orchestrator 170 and/or container 150. In an example, server system 100 may include more than one server 104. Additionally, server 104 may include more than one database 180. The server 104 may also include one or more processors (e.g., CPU 120A), memory devices (e.g., memory device 130A), and input/output devices (e.g., I/O 140C).

The container 150 may execute applications (e.g., application 165A-B) and associated microservices (e.g., MS 194A-G). In an example, the container 150 may be any execution environment. For example, the container 150 may be a server, such as a virtual server. Additionally, the container 150 may run in a physical server. The applications 165 may be stored on a single database or multiple databases. For example, Application 165A associated with cooperating microservices 194A-F may be stored on one database while Application 165B associated with cooperating microservices 194A and 194G may be stored on another database. An application 165 may be made up of multiple cooperating microservices 194. In an example, applications 165 may include one or more similar microservices 194. For example, both Application 165A and 165B may include microservice 194A. Additionally, applications 165 may include different versions of a microservice 194. For example, application 165A may include an original version of microservice 194A while application 165B includes an updated version of microservice 194A. In another example, application 165A and application 165B may both include the same version of microservice 194A.

The orchestrator 170 may coordinate the deployment of microservices 194 to container 150. In an example, the orchestrator 170 may be a server. The orchestrator 170 may also include one or more processors (e.g., CPU 120E), memory devices (e.g., memory device 130E), and input/output devices (e.g., I/O 140E). The orchestrator 170 may coordinate with the server 104 and container 150 to determine when and how to deploy microservices 194 to containers 150, which are later executed for clients. For example, the orchestrator 170 may schedule which microservices 194 run on a container 150. For example, orchestrator 170 may schedule microservices 194A-F corresponding to application 165A to run on container 150 while microservices 194 associated with application 165B are scheduled to run on a different container. Additionally, orchestrator 170 may schedule how many instances of an application (e.g., application 165A) are running at a specific time. For example, orchestrator 170 may limit application 165A to two hundred instances running at once. The orchestrator 170 may use information from server 104 to determine when to scale up or scale down particular versions of microservices 194 based on a deployment strategy and feedback regarding the success of a particular microservice 194. In an example, the orchestrator 170, server 104, and/or container 150 may be on the same physical or virtual machine. In another example, one or more of the orchestrator 170, server 104, and container 150 may be on different physical or virtual machines.

The server system 100 may also include one or more deployment profiles 190A-B stored on database 180. Additionally, deployment profiles 190A-B, hereinafter deployment profiles 190 may be stored on multiple databases 180. In an example, different deployment profiles 190 may be stored on different databases 180. Additionally, a database 180 may be partitioned and various deployment profiles 190 may be stored on the various partitions. Each deployment profile 190 may include a plurality of microservice identifiers ("IDs"). For example, deployment profile 190A may include microservice IDs 192A-F associated with cooperating microservices 194A-F. Additionally, deployment profile 190B may include microservice ID 192A and microservice ID 192G associated with cooperating microservices 194A and 194G.

A deployment profile (e.g., deployment profile 190A-B) may represent an enterprise application for various services. For example, a deployment profile may represent an application that acts like a unitary or monolithic application, but may be built from a group of cooperating microservices 194.

The server system 100 may communicate with one or more clients or computer systems 160A-C, such as a personal computer, server, network device, etc. Each computer system 160A-C may in turn include one or more physical processors (e.g., CPU 120B-D) communicatively coupled to memory devices (e.g., MD 130B-D) and input/output devices (e.g., I/O 140B-D).

As used herein, physical processor or processor 130A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 140A-E refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-E may be provided by one or more local buses of suitable architecture, for example, peripheral component interconnect (PCI).

Figure 2A:
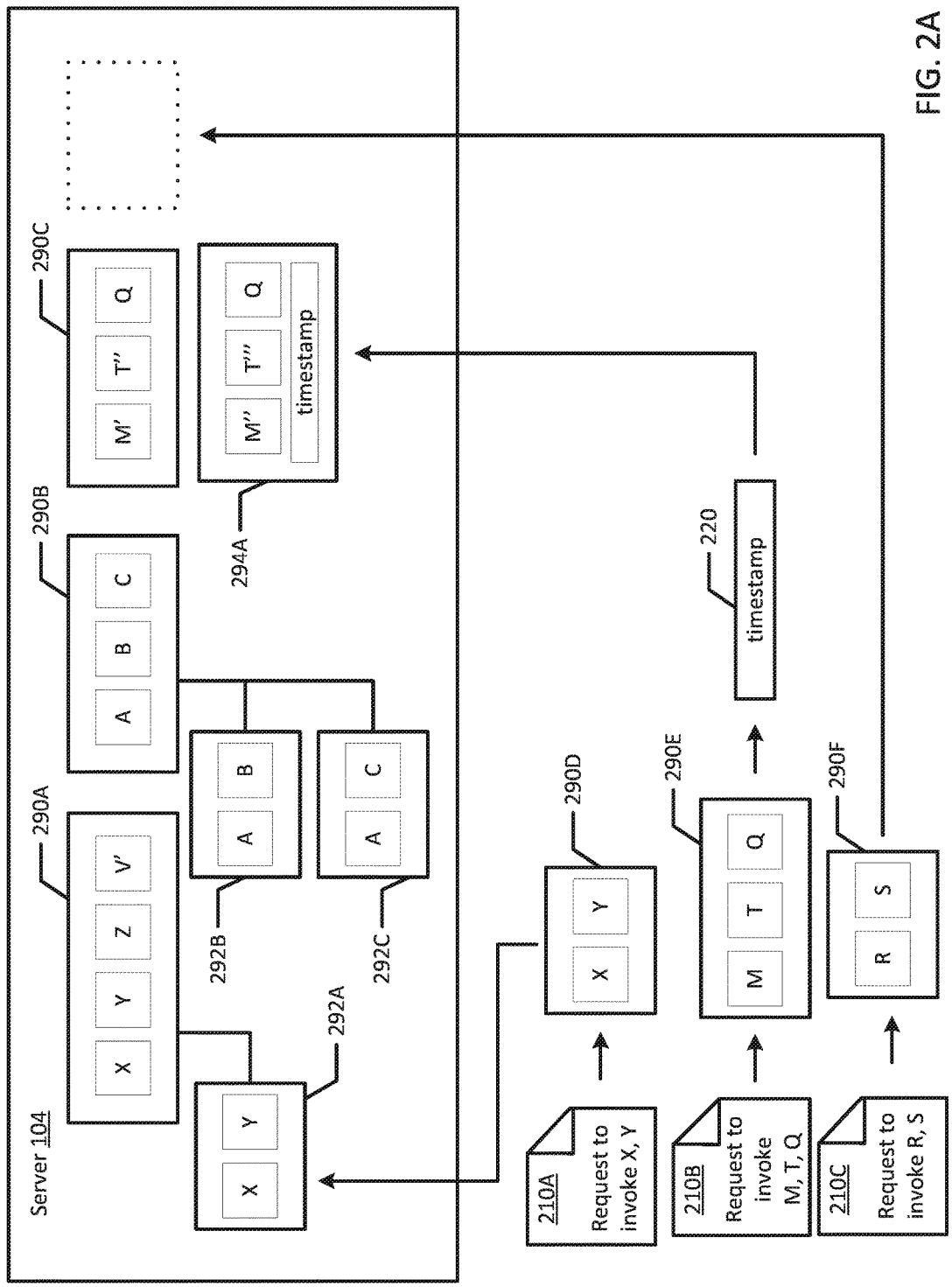
FIGS. 2A and 2B illustrate requests and application profiles on a server according to an example embodiment of the present disclosure.
Figure 2B:
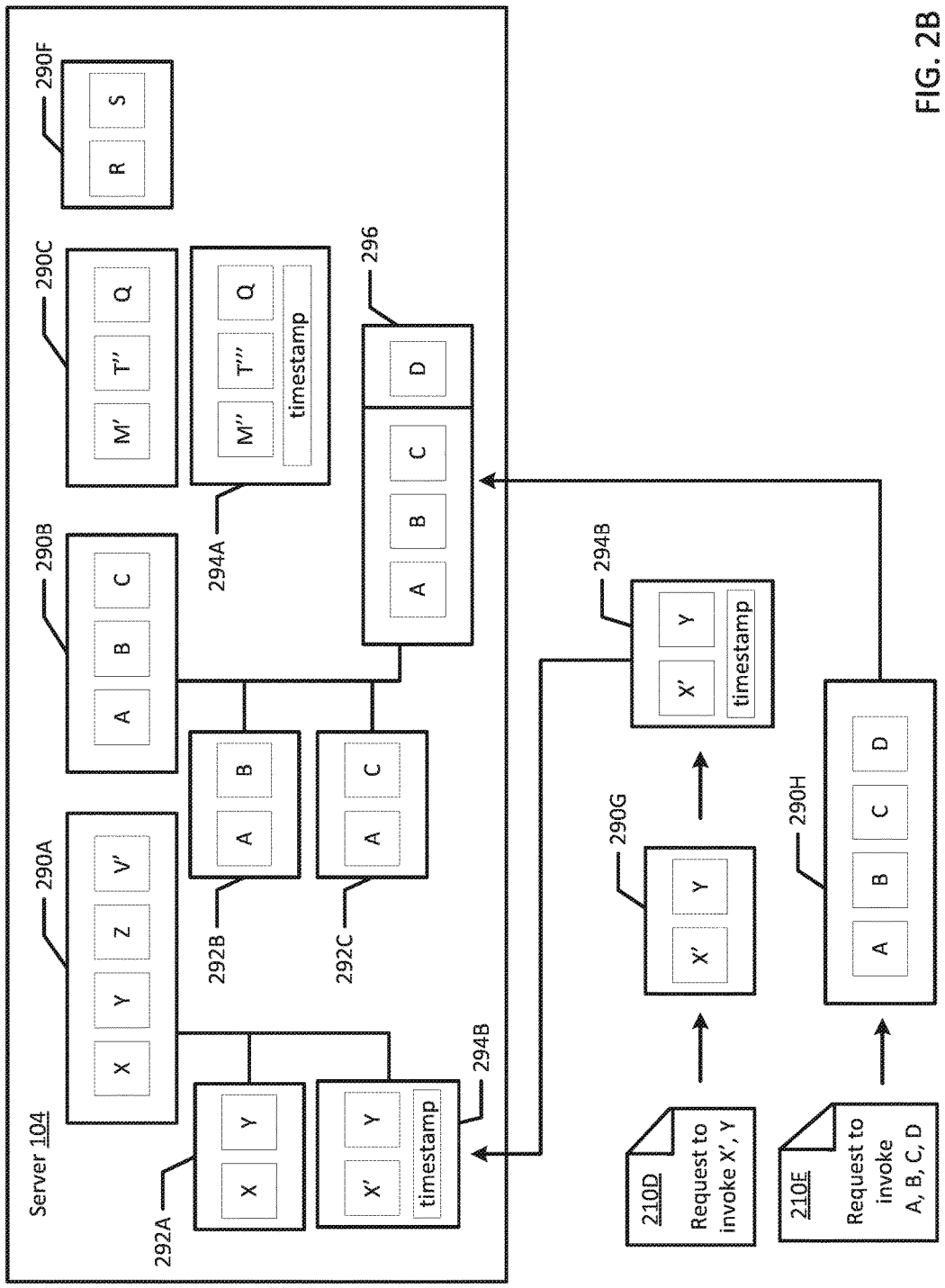

FIGS. 2A and 2B illustrate requests and application profiles on a server according to an example embodiment of the present disclosure. As illustrated in FIG. 2A, server 104 may include several application deployment profiles (e.g., 290A-C), hereinafter application deployment profile 290. The application deployment profiles 290 may be pre-existing. For example, the application deployment profiles 290 may be pre-loaded on the server 104 to ensure that tracing information related to future invocation requests 210 is categorized and classified according to a predetermine framework. Application deployment profiles 290 may be classified as a subset profile (e.g., subset profile 292A), an updated profile (e.g., 294A), or an extension profile (e.g., 296 illustrated in FIG. 2B). Application deployment profiles 290 may include one or more microservice IDs 192 corresponding to microservices 194. As used herein, microservice IDs 192 may be referred to by a letter designator, such as A, B, C, etc. For example, microservice IDs and/or microservices A, B, and C describe a collection of microservices 194 that are identified in application deployment profile 290B by microservice IDs. Microservice IDs 192 such as A, B, C, and X, Y, Z, etc. are examples of microservice IDs 192 associated with microservices 194 shown in FIG. 1. Additionally, updated versions of microservices 194 and their associated microservice IDs 192 are represented herein with a prime. For example, M' represents an updated version, such as a first updated version of microservice M. Similarly, T" and T'" represent updated versions, such as a second updated version and third updated version of microservice T respectively. As used herein, a microservice (e.g., 194A) may be associated with a specific corresponding microservice ID (e.g., 192A). The server 104 may store application deployment profiles 290, which may include information about the microservices 194 that are deployed on container 150. For example, server 104 may store an application deployment profile 190A with information (e.g., service name and version information) about microservices (e.g., microservice 194A-F) that cooperate to form application 165A. The application deployment profile 190A includes microservice IDs 192A-F associated with the corresponding microservices 194A-F deployed on container 150. When discussing the relationship between application deployment profiles 190, a profile may be described as having microservices 194 that are related, match, and/or are in common with another profile, which means that the microservices 194 linked to the microservice ID(s) 192 for the application deployment profile 190 are related, match, and/or are in common with microservices 194 linked to microservice ID(s) 192 of another application deployment profile 190.

A subset profile (e.g., 292A-C) may include profiles that have only common microservices 192 (e.g., common microservice IDs 192 associated with microservices 194) with an existing profile, but less microservices 194 than the existing profile. For example, subset profile 292A has microservices X and Y in common with application deployment profile 290A, which is made up of microservices X, Y, Z, and V. Application deployment profile 290A includes an updated version of microservice V (e.g., V'). Old versions of application deployment profiles 290 may remain on server 104 or may be decommissioned once an update has been fully tested and analyzed. For example, an old version of deployment profile 290A with an original version of microservice V may have been decommissioned after server 104 determined that microservice V' (e.g., updated version of microservice V) increased performance of the application deployment profile 290A without affecting other profiles. Additionally, subset profile 292B shares microservices A and B with application deployment profile 290A and subset profile 292C shares microservices A and C with application deployment profile 290B.

An extension profile 296 may include profiles that have common and uncommon microservices with an existing profile. For example, extension profile 296 may include each matching microservice and at least one mismatching microservice with an existing profile. As illustrated in FIG. 2B, extension profile 296 includes microservices A, B, and C, which match the existing application deployment profile 290B, but also has an uncommon or mismatching microservice D, which does not match the existing application deployment profile 290B.

An updated profile (e.g., 294A-B) may include a profile that is a new or updated version of an existing profile. For example, an updated profile may be an updated subset profile, an updated extension profile, or an updated existing profile. As illustrated in FIG. 2A, updated profile 294A includes a timestamp 220. For example, updated profile 294A includes updated versions of both the M and T microservices (e.g., M″ or second updated version of the M microservice and T‴ or third updated version of the T microservice). FIG. 2B also illustrates an updated profile 294B. For example, updated profile 294B includes an updated version of the X' microservice (e.g., X' or first updated version of the X microservice). An updated profile may include a single updated microservice (e.g., updated profile 294B). Additionally, an updated profile may include multiple updated microservices (e.g., updated profile 294A).

In an example, server 104 may include pre-loaded profiles (e.g., application deployment profiles 290A-C). Certain application deployment profiles 290A-C may be pre-loaded to ensure that profile classification and categorization follows a preferred construction and/or order. For example, by pre-loading application deployment profiles 290 on server 104, a developer may guide the organizational structure by determining which combinations of microservices 194 and the corresponding microservice IDs 192 get classified as subset profiles 292 and extension profiles 296. For example, if application deployment profile 290B is pre-loaded or pre-existing, then an invocation of profile AB (e.g., application deployment profile 290 including microservices A and B) may be classified as a subset profile 292B. However, if application deployment profile 290B is not pre-loaded or pre-existing, then an invocation of a profile consisting of microservices A and B may be loaded as a new profile or may not be loaded at all. Similarly, invocation of a profile consisting of microservices A, B, C, and D may be classified as an extension profile 296 if application deployment profile 290B is pre-existing, whereas the application deployment profile 290 consisting of microservices A, B, C, and D may be a subset profile if the server 104 included a pre-existing profile consisting of microservices A, B, C, D, and E.

Application deployment profiles 290 may be classified and organized on server 104 after invocation from a client through a computer system 160A-C, such as such as a personal computer, server, network device, etc. In an example, server 104 may receive tracing information related to a request (e.g., request 210A-E) to invoke a set of cooperating microservices 194. In an example, a microservice 194 may include a tracing component that intercepts request 210 and provides tracing information to server 104. The tracing component may be transparently embedded into the microservice 194. For example, the tracing component may be a Java servlet filter or a Java agent. In another example, the tracing information may be reported to server 104 from a reverse proxy server. For example, request 210A may include microservices X and Y. Then, the server 104 may capture tracing information reported during invocation and may build an application deployment profile 290D. Then, server 104 may compare the application deployment profile 290D against one or more existing profiles (e.g., application deployment profiles 290A-C) on server 104. For example, application deployment profile 290D (e.g., profile with X and Y microservices 194 made up of microservice IDs 192 corresponding to the X and Y microservices) may be compared against existing application deployment profiles 290A-C. Then, server 104 may classify the application deployment profile 290D. For example, request 210A is built and classified as a subset profile 292A of application deployment profile 290A because it includes only matching microservices 192 (e.g., microservices X and Y) of existing application deployment profile 290A, but has less microservices 192 than the existing application deployment profile 290A.

Request 210B to invoke microservices M, T, and Q may be built as application deployment profile 290E and compared to existing profiles 290A-C. In an example, a request (e.g., request 210B) may indicate only an identification of the microservices 192 (e.g., microservice M, T, Q) included in the request regardless of version. In another example, a request (e.g., request 210C) may identify the microservices 192 (e.g., microservice R and S) and specify the version of the microservices 192 to be invoked. Invocation request 210B may indicate microservices M, T, and Q, but not specify a version of these microservices 192 (e.g., M″). Server 104 may capture information about the version of the requested microservices 192 deployed on the container 150 and may provide information to the orchestrator and/or container 150 to supply the latest versions of the microservices 192 from the request 210B. For example, server 104 may include pre-existing application deployment profiles 290C and updated profile 294A. When tracing information related to invocation request 210B is received by the server 104, the server 104 may build application deployment profile 290E and compare it to existing profiles (e.g., 290C and 294A) on server 104 and recognize that the request 210B is for an existing profile 290C. Additionally, the server 104 may recognize that the updated profile 294A is the most recent version of the requested group of cooperating microservices 194. The server 104 may timestamp the updated profile 294A so that it can later track performance data associated with the updated application deployment profile 294A.

Request 210C to invoke microservices R and S may result in storing a new profile on server 104. For example, after receiving the tracing information related to request 210C, server 104 may determine that microservices R and S are unrelated to any of the existing application deployment profiles (e.g., 290A-C) stored within a database on server 104 and the server 104 may store a new application deployment profile (e.g., application deployment profile 290F) based on the request 210C. In an example, this new application deployment profile 290F may be considered an existing application deployment profile 290F for future requests. In another example, server 104 may notify the client or computer system (e.g., computer system 160A-C) that the requested microservices 194 are not associated with microservice IDs 192 stored on server 104 and may indicate that there is an error in the request 210C. Additionally, server 104 may send a notification that the application deployment profile 290F built from request 210C is not a pre-built existing profile (e.g., 290A-C).

As discussed above, a request (e.g., 210D) may indicate which version of a microservice 194 the client or computer system (e.g., computer system 160A-C) requests to invoke. For example, request 210D includes version information associated with microservices X and Y (e.g., first updated version of microservice X and original version of microservice 194 Y). Then, the server 104 may build an application deployment profile 290G and timestamp the profile since the application deployment profile 290G includes an updated microservice 194 (e.g., a microservice ID 192 that is linked to an updated microservice 194). After comparing the built application deployment profile 290G to the existing profiles (e.g., 290A-C and 290F) on server 104, the profile may be classified as an updated subset profile 294B. For example, the server 104 may have already included a subset profile 292A that had an original version of microservice X and an original version of microservice Y, which was a subset of profile 290A that included microservices X, Y, Z, and V'. The updated profile 294B, which includes the same microservices as subset profile 292A may be labeled as an updated subset profile 294B so that the server 104 can track performance data associated with the application deployment profile 290G. In an instance where the performance data indicates that the update has resulted in reduced performance or other issues, the server 104 may advantageously inform the container 150 and/or orchestrator 170 to revert back to using a previous version of an application 165 associated with profile 292A for future invocation requests thereby enabling the container 150 to execute a set of cooperating microservices 194 that provides optimal performance.

Request 210E to invoke microservices A, B, C, and D may be built as application deployment profile 290H from tracing information and may be classified as an extension profile 296 after comparing to the existing profiles (e.g., 290A-C and 290F, 292A-C, 294A, and 294B) associated with server 104. For example, an extension profile 296 may include every microservice 194 from an existing profile (e.g., profile 290B) and one or more additional microservices 194. In an example, an extension profile 296 may include one additional microservice 194. In another example, and extension profile may include more than one additional microservice 194. For example, an extension profile 296 of cooperating microservices A, B, and C may include microservice IDs A, B, C, D, and E corresponding to microservices A, B, C, D, and E.

Application deployment profiles 290 may be distinguished by an endpoint, service, collection of endpoints, collection of services, etc. In an example, an application deployment profile may be distinguished by an endpoint, such as a starting point or ending point for the cooperating microservices 194. For example, application deployment profiles may be distinguished by what microservice 194 is the initial microservice 194 in the group of cooperating microservices 194, such as a payment portal, a user interface for an end user, etc. In an example, application deployment profiles may be distinguished by an initial microservice 194, such as microservice A, and any other enterprise application that starts with microservice A may be organized and categorized with other application deployment profiles 290 starting with microservice A. Similarly, application deployment profiles 290 may be distinguished by an endpoint or microservice 194 that completes or finalizes the transacted services. For example, application deployment profiles 290 that each end with the same microservice 194, such as a payment processor to finalize a transaction, may be grouped together. Similarly, application deployment profiles 290 may be distinguished by a collection of endpoints. As discussed below, a server 104 may host several different enterprise applications for streaming movies, television shows, and audio files (e.g., audio books, music, etc.). Each of these services may use the same payment microservices 194 (e.g., microservices P and C), and this collection of endpoints may be used to help categorize and organize tracing information from invocation requests 210. Additionally, profiles may be distinguished based on whether a microservice 194 serves as either an entry point or a backend. For example, application deployment profiles 290 may be classified as related if the linked applications 165 start or end with the same microservice 194 (e.g., application deployment profiles 290 may be related if they start or end with the same microservice ID 192). For example, a group of cooperating microservices 194 that starts with microservice D may be related to a different group of cooperating microservices 194 that ends with microservice D. Additionally, a microservice 194 may provide a front end interface for an end user and may also be used to provide a REST application program interface for a third-party application as a backend service.

Additionally, application deployment profiles 290 may be distinguished by a service or collection of services. In an example, a container 150 may host various different services that each use the same payment microservices 194 (e.g., microservices P and C), but are for different types of transactions. For example, the collection of P, C, and M microservices 194 may be for buying and streaming movies, while the collection of P, C, and T microservices 194 may be for buying and streaming television shows. Additionally, cooperating microservices P, C, and A may be for buying and streaming audio books or music. The server 104 may distinguish these application deployment profiles 290 associated with the collections of microservices 194 by a service or type of transaction, such as microservices M, T, and A which are the differentiating services (e.g., differentiating between movies, television shows, and audio). Similarly, tracing information from invocation requests 210 may be built into application deployment profiles 290 and categorized based on specific groups of microservice IDs 192 in order for a request 210 to belong to a profile associated with an application 165. Additionally, server 104 may distinguish application deployment profiles 290 based on where an invocation begins (e.g., which microservice 194 starts the transaction for the group of cooperating microservices 194).

After application deployment profiles 290 are built, performance data associated with the application deployment profiles 290 may enable orchestrator 170 to deploy applications 165 and the corresponding microservices 194 to containers or execution environments using various techniques. As discussed above, the container 150 may be any execution environment. As used herein, container 150 is used as an illustrative example. The container 150 may be a server, such as a virtual server. Additionally, the container 150 may run in a physical server. In an example, container 150 and/or orchestrator 170 may roll out updated microservices 194 using various risk reduction techniques such as Canary releases, Blue-Green deployment, A/B testing, or the like. For example, container 150 and/or orchestrator 170 may implement a Canary release technique to reduce the risk of introducing new versions of microservices 194 by slowly rolling out the change to a small subset of clients before making the update available to all clients and computer systems 160A-C. In an example, after an updated version of a microservice 194 is deployed on the container 150, the orchestrator 170 may start routing a few invocation requests 210 to use the updated microservice 194. In an example, the container 150 and/or orchestrator 170 may use a random sample of invocation requests 210 to determine which request is associated with the updated microservice 194. Additionally, the container 150 and/or orchestrator 170 may select a predetermined subset of clients or computer systems 160 to use the new version. In another example, the orchestrator 170 may deploy the updated microservice 194 and the container 150 may execute the updated microservice 194 based on a client's profile or demographics, such as location, age, etc. In an example, once all clients have been routed to the new version, the old version of the microservice 194 may be decommissioned after the server 104 determines that there are no bugs or problems with the updated version of microservice 194. In the event of the new version performing poorly, a rollback strategy may be used to reroute users back to the old version of the microservice 194 until a new update is available or other problems have been fixed with the group of cooperating microservices 194, thereby preventing future performance issues. For example, an update to one microservice 194 may require updates to other microservices 194 such that an application 165 performs optimally.

Container 150 may also use Blue-Green deployment by using two different production environments. For example, one production environment may be idle while the other production environment is live or active. Additionally, the Blue production environment and the Green production environment may include the same applications 165A-B associated with application deployment profiles 190A-B). For example, when a microservice 194 is updated, the affected applications 165 may be deployed to the idle environment (e.g., Green environment) while current requests are still routed to the active environment (e.g., Blue environment). Once the new updated applications 165 are built and ready, the container 150 may route invocation requests 210 to the Green environment such that it is live while the Blue environment becomes idle. Similarly, additional updates may be implemented in the now idle Blue environment until they are ready to be rolled out. Once ready, the container 150 may route traffic to the Blue environment thereby switching the Green environment back to idle. After receiving performance data, the server 104 may direct the container 150 and/or orchestrator 170 to roll-back an update by quickly switching to the idle environment, which advantageously reduces any negative effects from a bug in an updated microservice 194.

Container 150 may also use or be used in A/B testing (also known as split testing or bucket testing) in order to test certain features of microservices 194. For example, with user interface microservices 194 and backend microservices 194, application level switches and/or static switches may be used to provide different variations to clients and users. For example, different versions of a user interface or a webpage may be provided to users with a different layout or configuration. In an example, one version may include a payment icon on the bottom of the page while a different version includes the payment icon in a banner. Variations may include changes to headlines, paragraph text, action buttons, links, images, etc. Performance data can be collected based on the variation to determine if a variation is more successful than another variation. For example, the different variations may be shown to similar users at the same time to determine which variation gets a better conversion ratio (e.g., which results in more sales).

Figure 3:
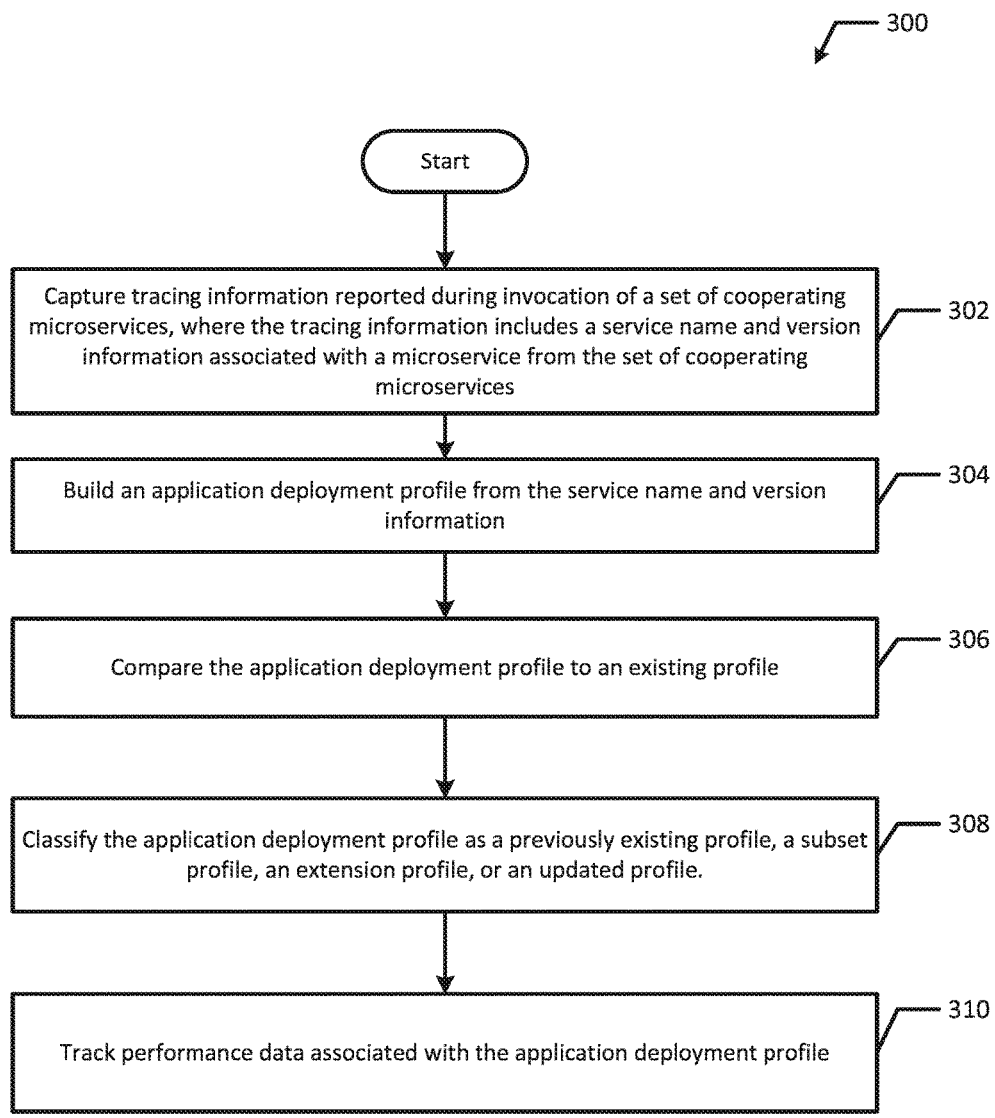
FIG. 3 illustrates a flowchart of an example process for automatic microservice problem detection in enterprise applications according to an example embodiment of the present disclosure.

FIG. 3 illustrates a flowchart of an example method 300 for automatic microservice problem detection in enterprise applications in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes a server capturing tracing information reported during invocation of a set of cooperating microservices, where the tracing information includes a service name and version information associated with a microservice from the set of cooperating microservices (block 302). For example, the server 104 may capture tracing information such as service name and version tuples used for the application invocation. For example, a container 150 may receive an invocation request (e.g., request 210A-E) for a set of distributed or cooperating microservices 194. In an example, a client may send a request 210 to the container 150 via a network. The client or computer system 160A-C may include a personal computer, server, network device, etc. Tracing information may include metadata that is logged and/or stored by server 104. The tracing information may be distributed during the invocation of the set of cooperating microservices 194. For example, an instrumented service may assign each invocation request 210 with a request ID, which may be passed to all microservices 194 involved in handling the request and the instrumented service may record information (e.g., tracing information), such as start time, end time, service name, version, etc. In an example, the service name may be a name or other identifier associated with each microservice 194 included in the request 210. Then, the server may build an application deployment profile from the service name and version information (block 304). For example, the server 104 may build an application deployment profile 290, which is made up microservice IDs 192 associated with each requested microservice 194. In an example, the sever 104 may build an application deployment profile 290 from the service name information. For example, an application deployment profile 290 may indicate which microservices 194 are requested, and the server 104 may determine that an update exists after comparing the application deployment profile 290 to existing application deployment profiles 290 on the server 104. In another example, the server 104 may build an application deployment profile 290 from both the service name and version information. For example, an application deployment profile 290 may indicate which version of each microservice 194 was included in the invocation request 210 (e.g., original version of microservice A, first updated version of microservice B, and second updated version of microservice C).

Then, the server may compare the application deployment profile to an existing profile (block 306). For example, the server 104 may compare the built application deployment profile 290 to other existing profiles stored on server 104. In an example, the server 104 may compare the application deployment profile 290 to each pre-existing application deployment profile 290 on the server 104. In another example, the server 104 may compare the application deployment profile 290 to specific groups of profiles or specific databases 180 on server 104. For example, the server 104 may compare profiles based on one or more endpoints or services included in the built application deployment profile 290. In an example, certain databases 180 or groups of profiles may be associated with specific endpoints and/or services such that the server 104 only compares application deployment profiles 290 with microservice A with a database 180 associated with profiles including microservice A. The server 104 may classify the application deployment profile as a previously existing profile, a subset profile, an extension profile, or an updated profile (block 308). For example, the server 104 may classify the application deployment profile 290 based on how the included microservice IDs 192 are related to and/or match existing profiles. In an example, the server 104 may initially determine whether the application deployment profile 290 is related or unrelated to an existing profile. For example, an application deployment profile 290 may be related to an existing profile if it has at least one microservice 194 (e.g., microservice ID 192 corresponding to microservice 194) in common with an existing profile. Conversely, an application deployment profile 290 may be unrelated if all of the microservices 194 are different between the two profiles. If an application deployment profile 290 is unrelated, it may be classified as a new profile (e.g., is not an existing profile and is not related to any other profiles). In an example, the new profile may be timestamped as the first invocation of the profile. The timestamp 220 may advantageously allow the server 104 to track each instance of an update. In an example, a hash of the combined versions of the microservices 194 may be used to identify a deployment profile 290.

The server 104 may also determine whether the application deployment profile 290 includes each matching microservice 194 (e.g., microservice ID 192 corresponding to microservice 194) and at least one mismatching microservice 194 (e.g., microservice ID 192 corresponding to microservice 194) as an existing profile (e.g., existing application deployment profile 290B, which includes microservices A, B, and C and application deployment profile 290H, which includes microservices A, B, C, and D), in which case the server 104 may classify the application deployment profile 290 as an extension profile 296. Additionally, the server 104 may determine whether the application deployment profile 290 includes only matching microservices 194 (e.g., microservice ID 192 corresponding to microservice 194), but less microservices 194 than an existing profile (e.g., exiting application deployment profile 290B, which includes microservices A, B, and C and an application deployment profile 290 including microservices A and B), in which case the server 104 may classify the application deployment profile 290 as a subset profile 292. The server 104 may also determine whether the application deployment profile 290 completely matches an existing profile (e.g., existing application deployment profile 290B including microservices A, B, and C and application deployment profile 290 including microservices A, B, and C), in which case the server 104 may classify the application deployment profile 290 as an existing profile.

Additionally, the server 104 may determine whether microservices 194 corresponding to microservice IDs 192 included in the application deployment profile 290 include different versions than the existing profiles. For example, if the versions mismatch between the application deployment profile 290 and an existing profile, the server 104 may create a new profile and/or timestamp the profile.

The server may track performance data associated with the application deployment profile (block 310). For example, the server 104 may track performance data such as system metrics, business metrics, faults, and/or out of band ratings based on the invoked application profile. In an example, system metrics may include CPU performance, memory consumption, network throughput, end user response time, etc. Additionally, business metrics may include number of orders, number of users registered, number of views or visitors, etc. Performance data may also include fault counts or faults such as abandoned shopping carts, network connectivity issues, unexpected application failures, etc. Additionally, performance data may include out of band ratings such as user ratings, application likes, or the like. By tracking performance data, the server 104 may advantageously determine which update or combination of updates is the source of performance losses. Additionally, the server 104 may use this information to direct the container 150 and or orchestrator 170 to roll-back an update or decommission an older version of a microservice 194.

Figure 4A:
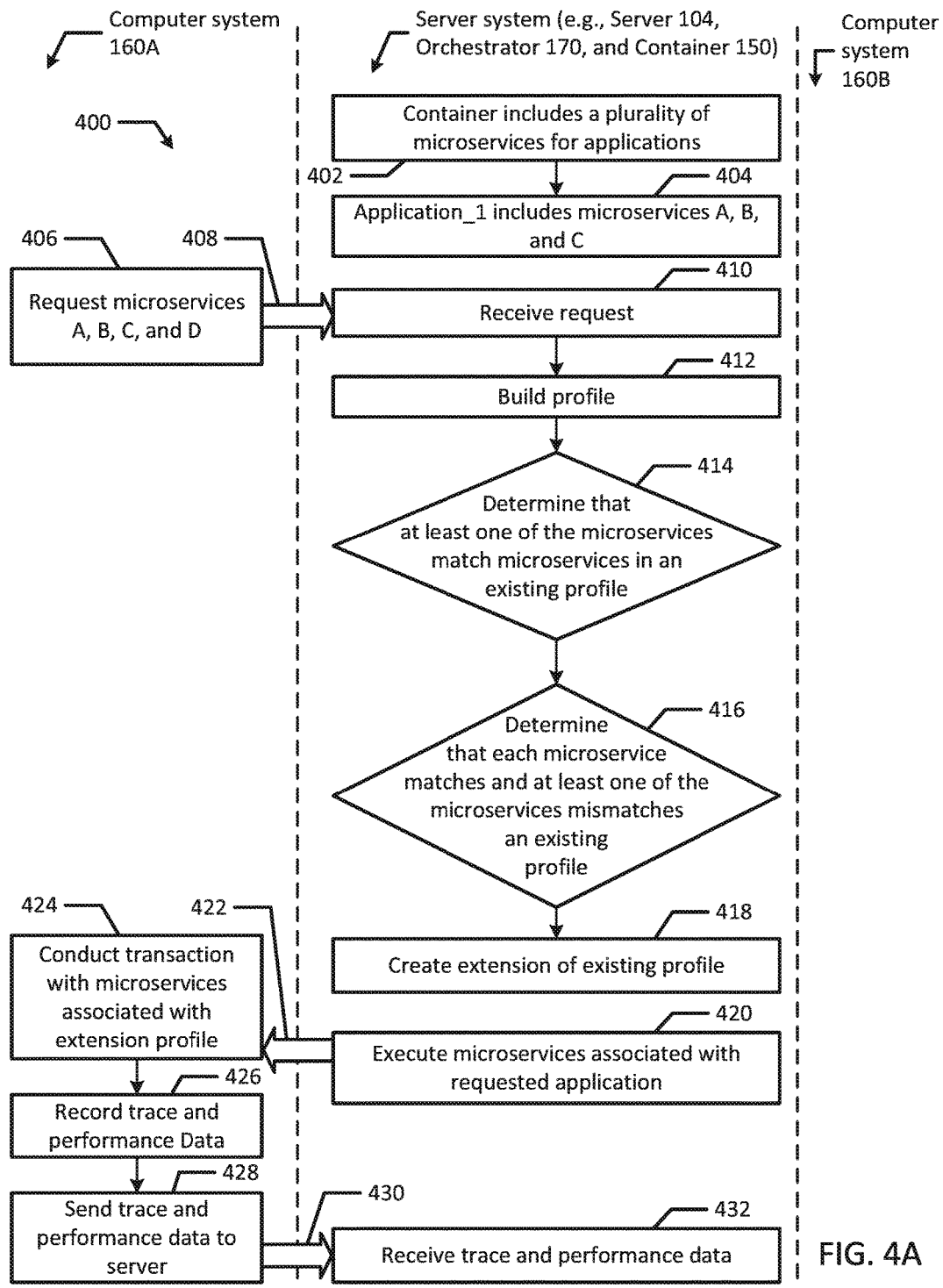
FIGS. 4A, 4B, and 4C illustrate a flow diagram of an example process for automatic microservice problem detection in enterprise applications according to an example embodiment of the present disclosure.
Figure 4B:
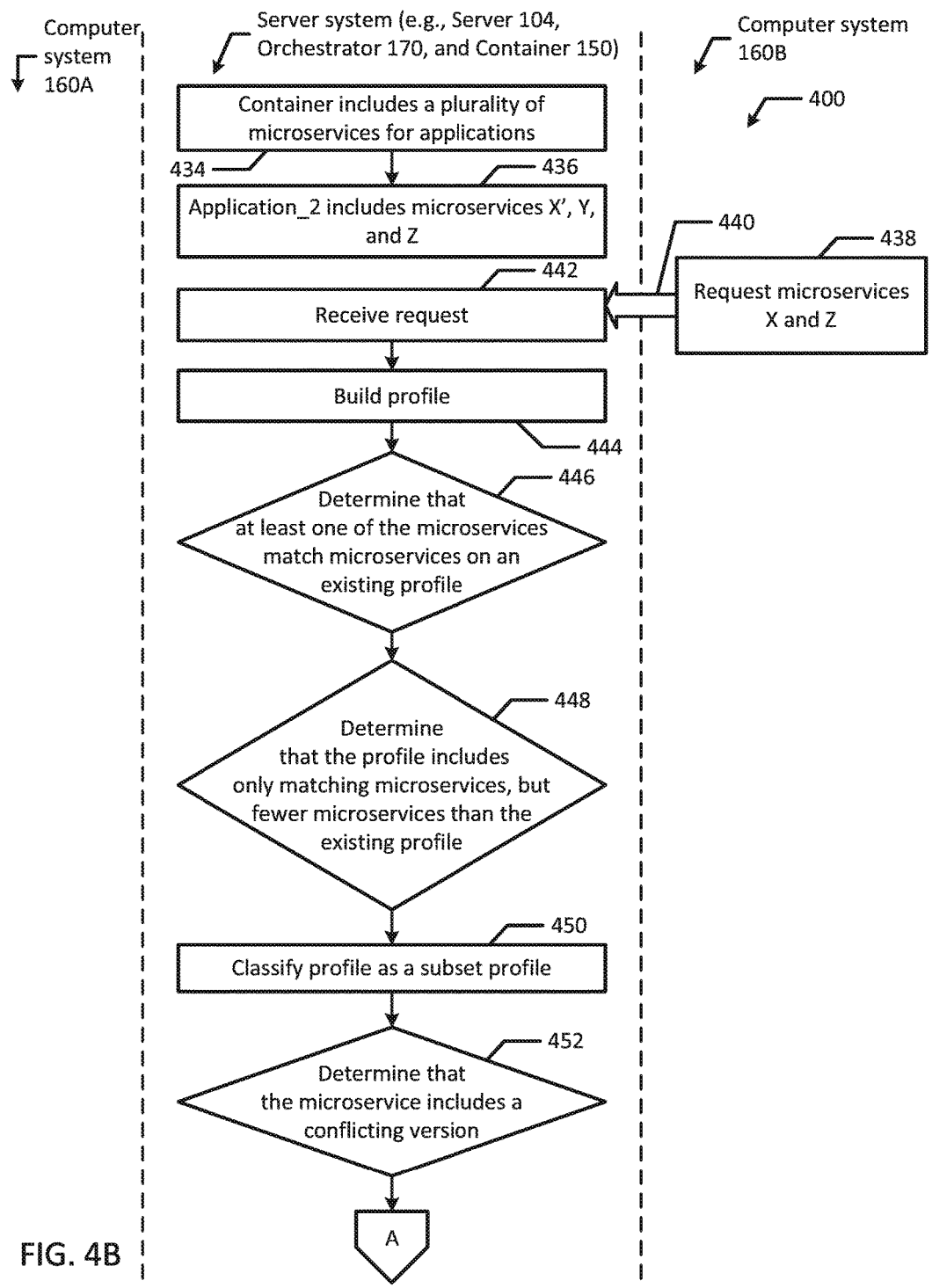
Figure 4C:
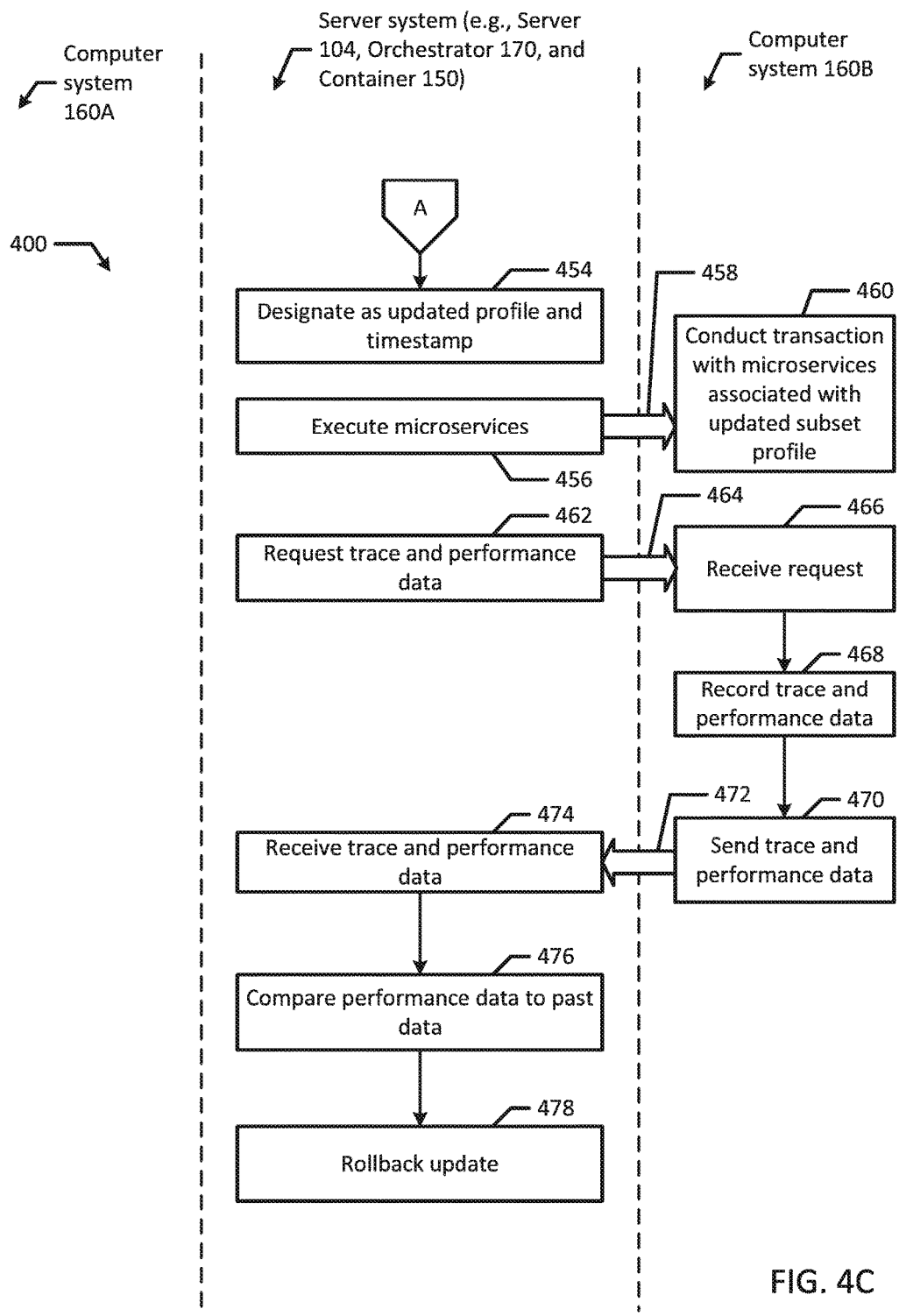

FIGS. 4A, 4B, and 4C illustrate a flowchart of an example method 400 for automatic microservice problem detection in enterprise applications. Although the example method 400 is described with reference to the flowcharts illustrated in FIGS. 4A, 4B, and 4C, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. For example, various computer systems (e.g., computer systems 160A-B) and a server system (e.g., server 104, orchestrator 170, and container 150 on the same physical or virtual machine) may communicate to perform example method 400.

In the illustrated example, the container 150 includes a plurality of microservices 194 for applications 165 (block 402). In an example, server 104, container 150, and orchestrator 170 may be on the same physical or virtual machine. In another example, the server 104, container 150, and orchestrator 170 may be on different machines. For example, container 150 may include microservices 194 associated with various different applications 165 such as movie streaming, TV streaming, audio streaming, etc. In an example, there may be many containers 150, each having one microservice 194. Additionally, container 150 may include more than one microservice 194. It should be appreciated that streaming services is used for illustration purposes and the container 150 may deploy microservices 194 for various other types of enterprise applications 165. For example, microservices 194 may be directed to user interfaces, middleware, database administration, etc. In an example, microservice IDs 192 and application deployment profiles 290 may be stored on one or more databases 180 on server 104. Microservices 194 and applications 165 may be deployed on container 150. Additionally, several servers 104 and/or containers 150 may work together in a cloud environment to deploy microservices 194 to end users. In the illustrated example, an application 165 (e.g., Application_1) includes microservices A, B, and C (block 404). For example, applications 165 deployed by container 150, such as Application_1, may include various microservices 194 that cooperate to perform the tasks associated with Application_1 (e.g., a movie streaming service). Computer system 160A requests microservices A, B, C, and D (blocks 406 and 408). In an example, a client may request microservices 194 through computer system 160A over a network. For example, the computer system 160A may send an invocation request 210 to a server system. Then, the container 150 receives the request (block 410). For example, container 150 may receive the invocation request 210, which may cause microservices 194 to send tracing data to server 104. The tracing data may indicate the service name and/or version information of the microservices 194 included in the request 210. In an example, an invocation request 210 and/or associated tracing data may indicate service name information. In another example, an invocation request 210 and/or associated tracing data may indicate both service name and version information (e.g., the request may be for specific versions of microservices 194).

The server 104 builds a profile (block 412). For example, after receiving the request 210, the server 104 may build an application deployment profile 290 from the tracing information reported by microservices 194 included in the request 210. Then, the server 104 determines that at least one of the microservices 194 (e.g., microservice ID 192 corresponding to microservice 194) match microservices 194 in an existing profile (block 414). For example, the server 104 may determine that microservice A matches microservices 194 in Application_1 and thus is related to an existing profile. Then, the server 104 determines that each microservice 194 matches and at least one of the microservices 194 mismatches an existing profile (block 416). For example, the server 104 may determine that each microservice in Application_1 (e.g., microservices A, B, and C) matches three of the four microservices in request 210. The server 104 may also determine that tracing information associated with request 210 includes an additional microservice 194 (e.g., microservice D, such as a movie rating microservice) that mismatches the existing profile for Application_1. Then, the server 104 creates an extension of an existing profile (block 418). For example, the server 104 may classify the application deployment profile 290 as an extension profile 296 because it is related to Application_1, but is an extended profile since it also includes microservice D.

The container 150 executes the microservices associated with the requested application (blocks 420 and 422). For example, the container 150 executes the microservices 194 for the client that initiated the request 210. In an example, the container 150 may execute microservices 194 immediately after receiving the invocation request 210. The computer system 160A conducts a transaction with the microservices 194 associated with the extension profile 296 (block 424). For example, the computer may select and stream a television show based on show rankings. Additionally, the computer system 160A records trace and performance data associated with the application 165 (block 426). For example, the computer system 160A may record performance data such as buffering time or completed orders associated with the extension profile 296. Additionally, the computer system 160A may record tracing information from the executed microservices 194. The computer system 160A sends the trace and performance data to the server 104 (blocks 428 and 430). For example, the computer system 160A may send tracing information and performance data to server 104 in real time. Additionally, the computer system 160A may send performance data in batches after a threshold amount of data has been obtained. The server 104 receives the trace and performance data (block 432). The server 104 may receive tracing information from the microservices 194. Additionally, the server 104 may receive and store the performance data to compare to past and future collections of performance data. For example, the server 104 may use stored performance data to advantageously determine whether to make changes to application deployment profiles and instruct the container 150 and/or orchestrator 170 to change deployment of microservices 194.

Additionally, the container 150 includes a plurality of other microservices 194 for various other applications 165 (block 434). For example, container 150 may include an application 165 for purchasing movie tickets. Similarly, server 104 may include an application deployment profile 290 associated with the application 165 for purchasing movie tickets. In the illustrated example, an application (e.g., Application_2) includes microservices X', Y, and Z (block 436). For example, X' may be a microservice 194 that provides a user interface to clients for selecting and purchasing movie tickets, Y may be a microservice 194 that stores information about showtimes and theaters, while Z is a microservice 194 for processing payments associated with ticket orders. Additionally, X' may be an updated version of the X microservice 194. Computer system 160B requests microservices X and Z (blocks 438 and 440). For example, computer system 160B may send an invocation request 210 to the container 150 that indicates the service name for microservices X and Z. In an example, the orchestrator 170 may intercept the request 210 before forwarding the request 210 to the container 150. Then, the container 150 receives the request 210 (block 442). In an example, the server 104 receives tracing information from the microservices 194 included in the request. For example, the server 104 may receive service name and version information from each microservice 194 included in invocation request 210.

The server 104 builds a profile from tracing information associated with the request (block 444). For example, after receiving the request 210, the server 104 may build an application deployment profile 290 from tracing information reported by microservices 194 included in the request 210. Then, the server 104 determines that at least one of the microservices 194 match microservice 194 in an existing profile (block 446). For example, the server 104 may determine that one of the microservice IDs 192 corresponding to a microservice 194 matches a microservice ID 192 of an existing profile. Additionally, server 104 may determine that microservices X and Y match microservices included in Application_2. In an example, server 104 may determine that an application deployment profile 290 is related to existing profiles based on one or more endpoints and/or services associated with the application deployment profile 290. The server 104 also determines that the profile includes only matching microservices 194, but fewer microservices 194 than the existing profile (block 448). For example, the server 104 may determine that the tracing data associated with request 210 includes a portion or subset of the microservices 194 included in Application_2. Then, the server 104 classifies the profile as a subset profile (block 450). For example, the application deployment profile 290 may for purchasing a specific movie ticket without the need of the Y microservice 194 to search different show times and theaters. The server 104 may classify the application deployment profile 290 as a subset profile 292 because it includes only matching microservice IDs 192 with an existing profile, but has less than the existing profile and is a subset of that profile.

The server 104 determines that the microservice 194 includes a conflicting version (block 452). For example, the server 104 may determine that the application request 210 is associated with an application deployment profile 290 on server 104 that includes an updated version of the X microservice 194 (e.g., X') while the request either didn't specify a version or specified an original version (e.g., X). In an example, the server 104 may use tracing information reported from microservices 194 invoked from request 210 to determine that microservice IDs 192 are associated with an updated microservice ID 192 in an application deployment profile 290 on server 104. Then, the server 104 designates the application deployment profile 290 as an updated profile 294 and timestamps the application deployment profile 290 (block 454). For example, the server 104 may timestamp the updated profile 294 for the invocation to ensure that the updated profile 294 can be properly tracked and documented, which advantageously allows the server 104 to associate performance data with specific profile instances.

The container 150 executes the updated subset of microservices 194 (blocks 456 and 458). For example, the container 150 may execute the microservices 194 for the client that initiated the request 210. In an example, the container 150 may execute microservices 194 immediately after receiving the invocation request 210. Additionally, the container 150 may execute microservices 194 before server 104 builds a profile. In an example, the orchestrator 170 may coordinate the deployment of microservices 194 to container 150. The computer system 160B conducts a transaction with microservices 194 associated with the updated subset profile (block 460). For example, an end user may purchase the movie ticket using the supplied user interface and payment processor. The server 104 requests trace and performance data (blocks 462 and 464). For example, the server 104 may request the computer system 160B to track performance data associated with the updated profile 294 (e.g., ticket purchases, user experience rating from the user interface, or the like). Additionally, the server 104 may request tracing information from the executed microservices 194. Then, the computer system 160B receives the request (block 466). In an example, the request may be included with the deployment of the updated profile 294. Additionally, the computer system 160B may receive the request directly from a third party that collects tracing information and performance data and submits batched data back to the server 104. The computer system 160B records trace and performance data (block 468). For example, for each invocation, the computer system 160 may record tracing information associated with the requested microservices 194. Additionally, the computer system 160 may record the number of successful ticket purchases or a user rating (e.g., zero to 5 stars) based on the user's experience while purchasing the tickets (e.g., asking the user about ease of use). The computer system 160B sends trace and performance data to the server 104 (blocks 470 and 472). For example, the computer system 160B may send tracing information and performance data to server 104 in real time. Additionally, the computer system 160B may send performance data in batches after a threshold amount of data has been obtained. Then, the server 104 receives the trace and performance data (block 474). The server 104 may receive tracing information from the microservices 194. Additionally, the server 104 may receive and store the performance data to compare to past and future collections of performance data. For example, stored performance data on server 104 may be used to advantageously determine whether to initiate changes to application deployment by container 150, such as rolling back an application 165 to an earlier version or deploying an application 165 to more customers.

The server 104 compares performance data to past data (block 476). The server 104 may receive and store the performance data to compare to past and future collections of performance data. Then, based on the comparison, the container 150 may rollback an update (block 478). For example, the server 104 may receive performance data that indicates the updated profile 294 performs worse than the previous version of Application_2 (e.g., the new user interface is not as intuitive as the previous edition and it has led to less completed transactions). Due to the reduced performance, the orchestrator 170 may direct container 150 to roll back the update until the user interface is upgraded to solve the performance issues. Additionally, the orchestrator 170 may use performance data from the server 104 to schedule deployment of various microservices 194.

Figure 5:
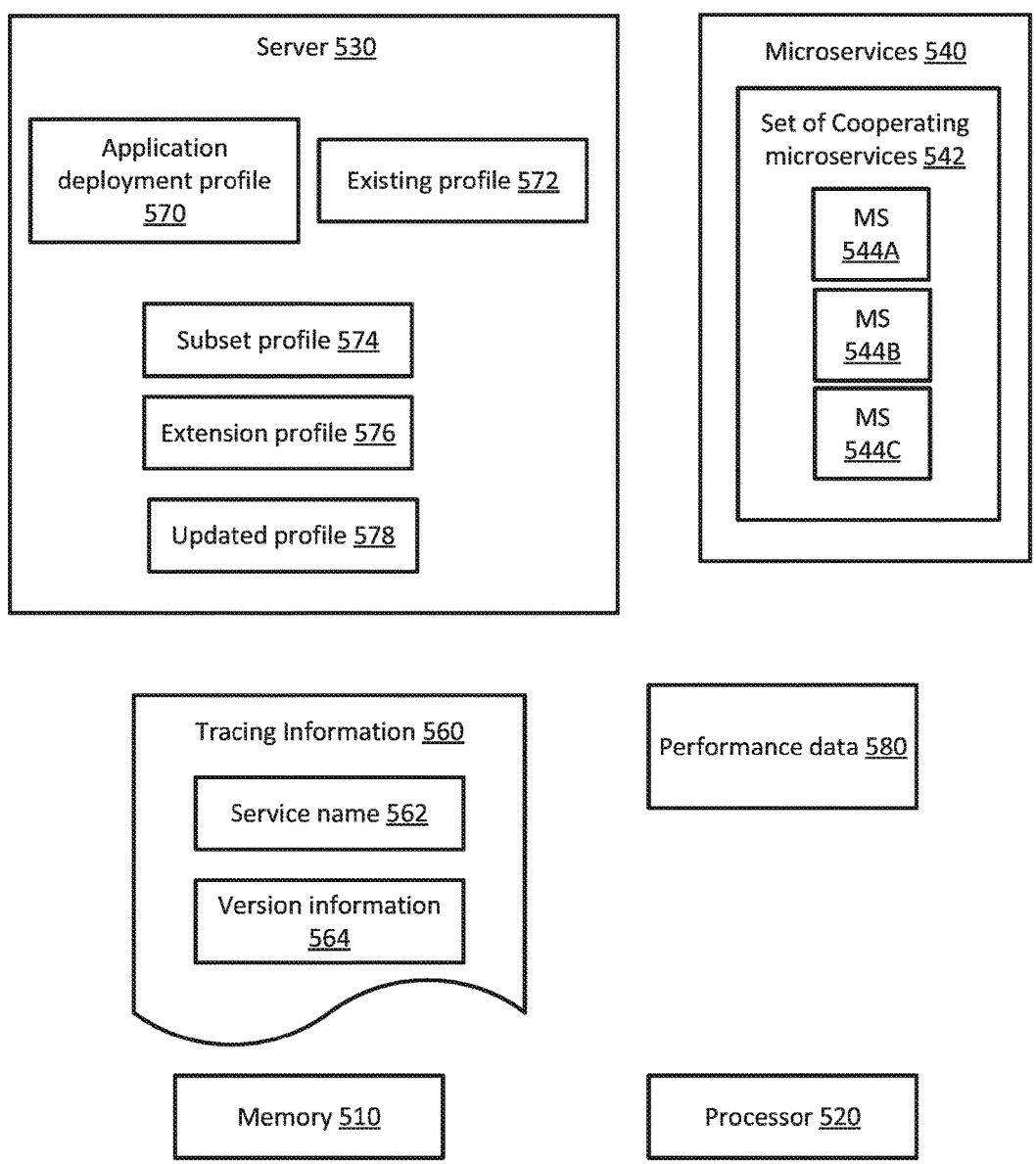
FIG. 5 illustrates a block diagram of an example automatic microservice problem detection system according to an example embodiment of the present disclosure.

FIG. 5 is a block diagram of an example automatic microservice problem detection system 500 according to an example embodiment of the present disclosure. The automatic microservice problem detection system 500 may include a memory 510, a processor 520 in communication with the memory 510, and a server 530 managing cooperating microservices 540. The server 530 may execute on the processor 520 to capture tracing information 560 reported during invocation of a set of cooperating microservices 542. The tracing information may include a service name 562 and version information 564 associated with at least one microservice 544A-C of the set of cooperating microservices 542. Additionally, the server 530 may build an application deployment profile 570 from the service name 562 and version information 564. The server 530 may compare the application deployment profile 570 to an existing profile 572, and the server 530 may classify the application deployment profile 570 as a previously existing profile 572, a subset profile 574, an extension profile 576, and/or an updated profile 578. The server 520 may track performance data 580 associated with the application deployment profile 570. Accordingly, the server 520 may use the performance data 580 to decide which version of a microservice (e.g., 544A-C) is best suited for an application and the server 520 may advantageously determine whether to make changes to application deployment, such as instructing a container to roll back an application to an earlier version or deploy an application to more customers, thereby enabling the container to deploy a set of cooperating microservices 542 that provides optimal performance.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
 a memory;
 at least one processor in communication with the memory; and
 at least one server managing a plurality of cooperating microservices, wherein the at least one server executes on the at least one processor to:
 capture tracing information reported by a microservice of a set of cooperating microservices during invocation of the set of cooperating microservices, wherein the tracing information includes a service name and version information associated with at least one microservice of the set of cooperating microservices;
 build an application deployment profile from the service name and version information;
 compare the application deployment profile to an existing application deployment profile;

classify the application deployment profile as at least one of a previously existing profile, a subset profile, an extension profile, and an updated profile; and track performance data associated with the application deployment profile.

2. The system of claim 1, wherein the version information and service name is combined to form a version tuple.

3. The system of claim 1, wherein the performance data includes at least one of system metrics, business metrics, faults, and an out of band rating.

4. The system of claim 1, wherein the application deployment profile is distinguished by at least one of an endpoint, a service, a collection of endpoints, and a collection of services.

5. A method comprising:

capturing, by a server, tracing information reported by a microservice of a set of cooperating microservices during invocation of the set of cooperating microservices, wherein the tracing information includes a service name and version information associated with at least one microservice of the set of cooperating microservices;

building, by the server, an application deployment profile from the service name and version information;

comparing, by the server, the application deployment profile to an existing application deployment profile;

classifying, by the server, the application deployment profile as at least one of a previously existing profile, a subset profile, an extension profile, and an updated profile; and tracking, by the server, performance data associated with the application deployment profile.

6. The method of claim 5, wherein the application deployment profile is distinguished by at least one of an endpoint, a service, a collection of endpoints, and a collection of services.

7. The method of claim 5, wherein classifying the application deployment profile includes determining, by the server, a first status of the application deployment profile as one of related to the existing profile and unrelated to the existing profile.

8. The method of claim 7, wherein responsive to determining the first status as unrelated to the existing profile, the server stores the application deployment profile as a new profile.

9. The method of claim 7, wherein responsive to determining the first status as unrelated to the existing profile, the server sends a notification that the deployment profile is not a pre-built existing profile.

10. The method of claim 7, wherein classifying the application deployment profile further includes determining, by the server, a second status of the application deployment profile as one of including each matching microservice and at least one mismatching microservice as the existing application deployment profile, including only matching microservices, but less microservices than the existing application deployment profile, and completely matching the existing application deployment profile, wherein responsive to determining the second status as including each matching microservice and at least one mismatching microservice as the existing application deployment profile, the server updates the existing application deployment profile to include an extension profile with the version information included in the application deployment profile, responsive to determining the second status as including only matching microservices, but less microservices than the existing application deployment profile, the server classifies the application deployment profile as a subset of the existing application deployment profile, and responsive to determining the second status as completely matching the existing application deployment profile, the server classifies the application deployment profile as the existing application deployment profile.

11. The method of claim 10, wherein classifying the application deployment profile further includes determining, by the server, a third status of the application deployment profile as one of updated from the existing application deployment profile and pre-existing, wherein responsive to determining the third status as updated, the server designates the application deployment profile as an updated profile.

12. The method of claim 11, wherein the updated profile includes a timestamp.

13. The method of claim 5, wherein the tracing information is received by a local agent and then sent to the server.

14. The method of claim 5, wherein the version information and service name is combined to form a version tuple.

15. The method of claim 5, wherein the performance data includes at least one of system metrics, business metrics, faults, and an out of band rating.

16. The method of claim 5, further comprising rolling back an application deployment profile to the existing application deployment profile based on the performance data.

17. A non-transitory machine readable medium storing code, which when executed by a processor, causes a server to:

capture tracing information reported by a microservice of a set of cooperating microservices during invocation of the set of cooperating microservices, wherein the tracing information includes a service name and version information associated with at least one microservice of the set of cooperating microservices;

build an application deployment profile from the service name and version information;

compare the application deployment profile to an existing application deployment profile;

classify the application deployment profile as at least one of a previously existing profile, a subset profile, an extension profile, and an updated profile; and track performance data associated with the application deployment profile.

18. The non-transitory machine readable medium of claim 17, wherein the application deployment profile is distinguished by at least one of an endpoint, a service, a collection of endpoints, and a collection of services.

19. The non-transitory machine readable medium of claim 17, wherein classifying the application deployment profile includes:

determining, by the server, a first status of the application deployment profile as one of related and unrelated to the existing application deployment profile, wherein responsive to determining the first status as unrelated, the server stores the application deployment profile as a new profile;

determining, by the server, a second status of the application deployment profile as one of including at least one matching microservice and at least one mismatching microservice as the existing application deployment profile, completely matching the existing application deployment profile, and including only matching microservices, but less microservices than the existing application deployment profile, and completely matching the existing application deployment profile, wherein responsive to determining the second status as including each matching microservice and at least one mismatching microservice as the existing application deployment profile, the server updates the existing application deployment profile to include an extension profile with the version information included in the application deployment profile, responsive to determining the second status as including only matching microservices, but less microservices than the existing application deployment profile, the server classifies the application deployment profile as a subset of the existing application deployment profile, and responsive to determining the second status as completely matching the existing application deployment profile the server classifies the application deployment profile as the existing application deployment profile; and determining, by the server, a third status of the application deployment profile as one of updated from the existing application deployment profile and pre-existing, wherein responsive to determining the third status as updated, the server designates the application deployment profile as an updated profile.

20. The non-transitory machine readable medium of claim 17, wherein the updated profile includes a timestamp.

* * * * *